No. 757,088. PATENTED APR. 12, 1904.
C. A. BRINLEY.
SHEET METAL PULLEY.
APPLICATION FILED JAN. 29, 1904.
NO MODEL.
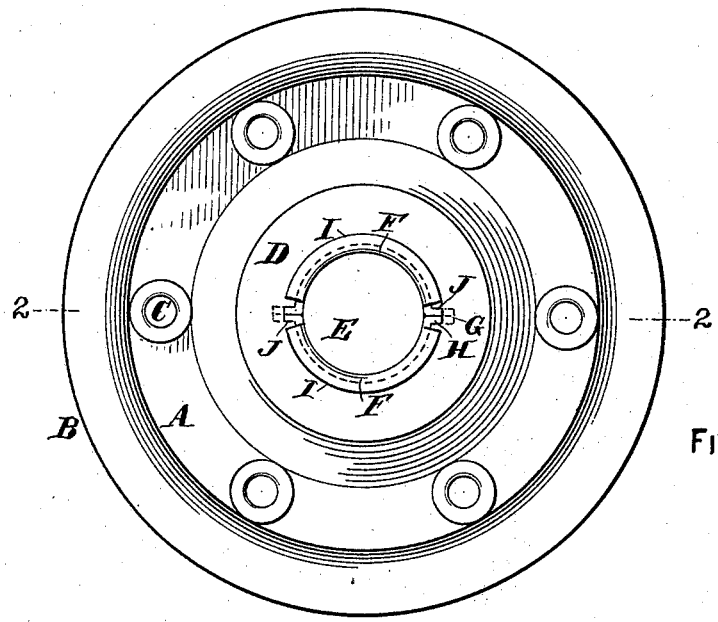
FIG. 1
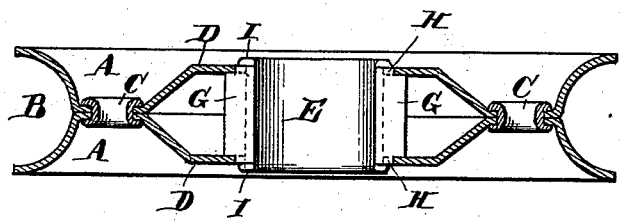
FIG. 2
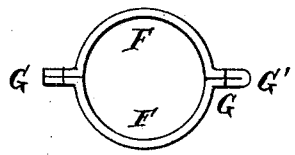
FIG. 4
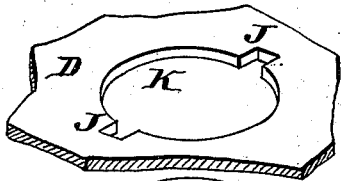
FIG. 3
FIG. 5
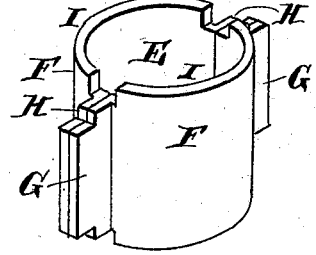
ATTEST:
R. M. Kelly
Wm. Rooney
INVENTOR:
Charles A. Brinley
By his atty
THE NORRIS PETERS CO., PHOTO-LITHO., WASHINGTON, D. C.

No. 757,088. Patented April 12, 1904.

UNITED STATES PATENT OFFICE.

CHARLES A. BRINLEY, OF PHILADELPHIA, PENNSYLVANIA, ASSIGNOR TO AMERICAN PULLEY COMPANY, A CORPORATION OF PENNSYLVANIA.

SHEET-METAL PULLEY.

SPECIFICATION forming part of Letters Patent No. 757,088, dated April 12, 1904.

Application filed January 29, 1904. Serial No. 191,094. (No model.)

*To all whom it may concern:*

Be it known that I, CHARLES A. BRINLEY, of the city and county of Philadelphia, State of Pennsylvania, have invented an Improvement in Sheet-Metal Pulleys, of which the following is a specification.

My invention has reference to sheet-metal pulleys; and it consists of certain improvements, which are fully set forth in the following specification and shown in the accompanying drawings, which form a part thereof.

The object of my invention is to provide a suitable construction of sheet-metal pulley or sheave which shall be inexpensive to manufacture and embody great strength.

In carrying out my invention I form the pulley of two halves from sheet-steel into the requisite form, so that when placed face to face they form the sides and flanged rim, said halves being secured together by eyelets or otherwise and combined with a suitable hub-piece, which acts as a spacing device to hold the two sides at a definite distance apart and so interlocked with said sides as to hold them from spreading and against rotating within them.

My invention also comprehends details of construction, which, together with the above features, will be better understood by reference to the drawings, in which—

Figure 1 is a side elevation of a pulley embodying my invention. Fig. 2 is a sectional view of same on line 2 2 of Fig. 1. Fig. 3 is a perspective view of the parts making up the hub structure disconnected, and Figs. 4 and 5 are modified forms of hub-pieces.

A A are the two halves of the pulley and are stamped from sheet-steel. They are similar, and when placed face to face they produce at the rim or periphery the flanges B, constituting the groove, such as required by a sheave. These flanges may be of any other shape desired. The abutting faces of the halves A A may be united by the eyelets C, of which there may be any number desired. The central portions D D of the halves A A are cupped, so as to be considerably separated, and they are held in this relative position by the spacing-hub E. This hub structure is an important feature of my invention, and I will now describe it in detail.

The hub E is made of two semicircular halves F F, having flanges G G, which when placed together constitute the structure shown in Fig. 3 and comprising a ring having the flanges G. The ends of the flanges are stepped, so as to make four shorter small flanges H. The edges I of the parts F are extended slightly beyond the flanges G H for turning over the edges of the holes K of the plates A A, as shown in Figs. 1 and 2. The hub-holes K of the face-plates have one or more notches J to receive the flanges H of the hub, so that the hub cannot turn in the pulley. The flanges G hold the two parts D D of the face-plates A at the proper distance apart, and the flanges I when turned over or upset hold said parts D D fixedly to the hub. It will also be seen that the two parts of the hub are held together by the locking action of the parts D upon the flanges I and H.

If desired, the parts F F may be of one continuous piece, as indicated at Fig. 4, in which two of the flanges G G are integral, as at G'. In this case it is evident that one set of flanges G may be omitted, in which case the hub will be as shown in Fig. 5.

The hub structure may be employed in any type of sheet-steel pulley. Hence I do not confine myself to the use of the eyelets C for holding the two parts A A together, and likewise the said eyelets may be employed in a pulley having any other construction of hub, if so desired.

While I prefer the construction shown as being excellently adapted for the purpose of my invention, the details may be modified without departing from the spirit of the invention.

Having now described my invention, what I claim as new, and desire to secure by Letters Patent, is—

1. A sheet-metal pulley consisting of two pulley parts formed of stamped sheet metal having central holes, in combination with a hub extending through the holes of the pulley parts and consisting of semicircular parts having flanges G acting as spacing portions between the two pulley parts and also provided with edges I flanged over upon said two pulley parts to hold them to the hub.

2. A sheet-metal pulley consisting of two pulley parts formed of stamped sheet metal having central holes provided with one or more notches J, in combination with a hub extending through the holes of the pulley parts and consisting of semicircular parts having flanges G acting as spacing portions between the two pulley parts and flanges H to fit into the notches J of the pulley parts and further provided with edges I flanged over upon said two pulley parts to hold them to the hub and upon the spacing portions.

3. In a sheet-metal pulley, the combination of two pulley parts A A of stamped sheet metal united together and having holes at their central portions, with a hub consisting of sections of sheet metal which are abutted to form a circular bearing and having flanges of shorter length than the length of the hub to form spacing-flanges between the pulley parts and also having the curved edges of the hub flanged or upset over the edges of the holes of the pulley parts to hold them to the hub and upon the spacing-flanges.

4. In a sheet-metal pulley, two pulley parts A A of stamped sheet metal united together and having holes at their central portions, combined with a hub consisting of sheet metal curved to form a circular bearing and having flanges of shorter length than the length of the hub abutted together to form spacing-flanges between the pulley parts and also having the curved edges of the said hub flanged or upset over the edges of the holes of the pulley parts to hold them to the hub and upon the spacing-flanges and further provided with means to lock the hub within the pulley parts against turning.

5. A sheet-metal pulley, consisting of two pulley parts formed of stamped sheet metal formed with abutting faces and cup-shaped central portions D having central holes and united by a series of eyelets between the hub and periphery, in combination with a hub extending through the holes of the pulley parts and consisting of two semicircular parts having flanges G acting as spacing parts between the two pulley parts and also provided with edges I formed over upon said two pulley parts to hold them to the hub.

6. A sheet-metal pulley consisting of two pulley parts formed of stamped sheet metal, combined with a hub having a circular portion extending through the pulley parts and flanged or upset over them and spacing-flanges extending laterally from the circular part to retain the pulley parts at the requisite distance apart.

7. A sheet-metal pulley consisting of two pulley parts formed of stamped sheet metal, combined with a hub having a circular portion extending through the pulley parts and flanged or upset over them and spacing-flanges extending laterally from the circular part to retain the pulley parts at the requisite distance apart, and provided with locking-flanges H to fit into the pulley parts and prevent them turning on the hub.

In testimony of which invention I hereunto set my hand.

CHARLES A. BRINLEY.

Witnesses:
R. M. HUNTER,
R. M. KELLY.